(No Model.)
F. A. BLACKMER.
BARBED FENCING.
No. 305,277. Patented Sept. 16, 1884.
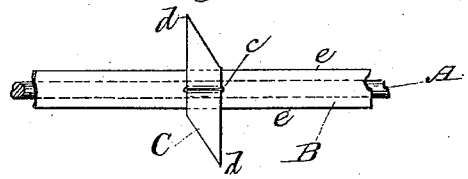
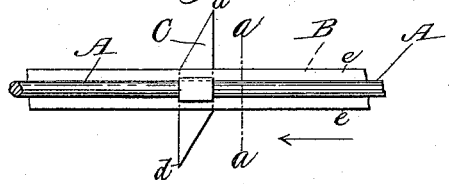
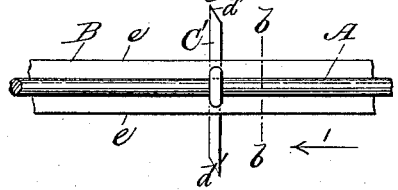
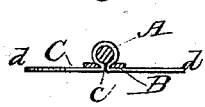  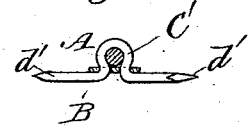
Witnesses;
Andrew J. Upham.
John C. Dewey
Inventor;
Francis A. Blackmer,

UNITED STATES PATENT OFFICE.

FRANCIS A. BLACKMER, OF SPRINGFIELD, ASSIGNOR TO THE WASHBURN & MOEN MANUFACTURING COMPANY, OF WORCESTER, MASSACHUSETTS.

BARBED FENCING.

SPECIFICATION forming part of Letters Patent No. 305,277, dated September 16, 1884.

Application filed May 15, 1882. (No model.)

*To all whom it may concern:*

Be it known that I, FRANCIS A. BLACKMER, of the city of Springfield, in the county of Hampden and State of Massachusetts, have invented certain new and useful Improvements in Barbed Fencing; and I do hereby declare that the following is a full, clear, and exact description of the same, reference being had to the accompanying drawings, forming a part of this specification, and in which—

Figure 1 represents a top or plan view of a section of my barbed fencing complete. Fig. 2 represents a view of the opposite side of the section shown in Fig. 1. Fig. 3 represents a top or plan view of a section of a modification of my barbed fencing, a wire barb being substituted for the sheet-metal barb shown in Figs. 1 and 2, as will be described hereinafter. Fig. 4 represents a cross-section taken on line $a\,a$, Fig. 2, looking in the direction of the arrow, same figure. Fig. 5 represents a cross-section taken on line $b\,b$, Fig. 3, looking in the direction of the arrow 1, same figure; and Fig. 6 represents a modification of the cross-section shown in Fig. 4, the edges of the metal strip being bent or pressed up so as to partially encircle the barb, as will be described hereinafter.

To enable those skilled in the art to which my invention belongs to make and use the same, I will proceed to describe it more in detail.

In the drawings, the part marked A represents a strand of wire. This wire may be round, as shown in the drawings, or of any other form, if preferred, and of any size desired.

The part B represents a strip of thin metal, of any suitable material. Said strip has slots or cuts along the center line thereof, as shown at $c$, Fig. 1, at any desired distance apart, for the insertion of the ends of the barb C.

The part C represents a sheet-metal barb with pointed ends $d\,d$. The part C' represents a wire barb, which may be applied or fastened to the fencing in the same way as the sheet-metal barb is fastened, to be described hereinafter; but I prefer to fasten it, in the manner shown in Figs. 3 and 5 of the drawings, by inserting the ends $d'\,d'$ through two holes punched or stamped out of the strip B, and then bending the ends back, as shown in Figs. 3 and 5 of the drawings.

My improved barb fencing may be constructed as follows: Take a strand of wire of any desired size and place it longitudinally along the strip B, which has previously had slots or openings $c$ made along its center line at any desired distance apart. Then insert the ends $d\,d$ of the barb C through slots $c$, one on each side of the strand A, so as to straddle the same, and press the barb down so as closely to encircle said strand. Then bend the ends $d\,d$ out from each other and press them down, so as to rest for support upon the flat side of the strip B, as fully shown in Fig. 4 of the drawings.

If preferred, the edges $e\,e$ of the strip B may be pressed or bent up so as to partially encircle the barb C and the strand, as shown in Fig. 6 of the drawings, without departing from the principle of my invention.

A wire barb, C', may be substituted for the sheet-metal barb C and applied or fastened to the fencing in the manner above described.

In my application of even date herewith, serially numbered 61,452, I have set forth and claimed a barbed-strip fencing comprising a thin strip of metal, a re-enforcing piece, and barbs, the latter having portions bent or looped around both said strip and re-enforcing piece, so as to fasten the two firmly together. I do not claim such construction as part of the present invention.

Having described my improvements in barbed fencing, what I claim therein as new and of my invention, and desire to secure by Letters Patent, is—

A barbed fencing comprising a metal strip, a re-enforcing wire, and barbs, the latter having a central loop which encircles the wire, and having their ends passed through holes in the strip and pointed in opposite directions, substantially as described.

FRANCIS A. BLACKMER.

Witnesses:
ANDREW J. UPHAM,
JOHN C. DEWEY.